(12) United States Patent
Wharton

(10) Patent No.: US 9,337,949 B2
(45) Date of Patent: May 10, 2016

(54) CONTROL SYSTEM FOR AN AERIALLY MOVED PAYLOAD

(75) Inventor: Stephen Wharton, Weatherford, TX (US)

(73) Assignee: CABLECAM, LLC, Fort Worth, TX (US)

( * ) Notice: Subject to any disclaimer, the term of this patent is extended or adjusted under 35 U.S.C. 154(b) by 671 days.

(21) Appl. No.: 13/600,558

(22) Filed: Aug. 31, 2012

(65) Prior Publication Data

US 2013/0051805 A1      Feb. 28, 2013

Related U.S. Application Data

(63) Continuation-in-part of application No. 13/471,924, filed on May 15, 2012.

(60) Provisional application No. 61/529,676, filed on Aug. 31, 2011, provisional application No. 61/529,697, filed on Aug. 31, 2011, provisional application No. 61/532,788, filed on Sep. 9, 2011, provisional application No. 61/532,741, filed on Sep. 9, 2011, provisional application No. 61/607,993, filed on Mar. 7, 2012.

(51) Int. Cl.
*H04J 14/02* (2006.01)

(52) U.S. Cl.
CPC ............. *H04J 14/02* (2013.01); *H04J 14/0282* (2013.01)

(58) Field of Classification Search
CPC ... H04J 14/02; H04J 14/0215; H04J 14/0216; H04J 14/0227
USPC ............. 398/79, 96, 140, 141, 135, 182, 183, 398/33, 138, 139; 348/144, 146, 143, 147, 348/61, 157, 159; 73/1.77, 1.79, 104; 248/323, 328, 329, 317
See application file for complete search history.

(56) References Cited

U.S. PATENT DOCUMENTS 2,035,107 A     3/1936   Voss
3,221,897 A    12/1965   Matheson
(Continued)

FOREIGN PATENT DOCUMENTS

DE      102006036769      4/2008
GB         2422061 A      7/2006
(Continued)

OTHER PUBLICATIONS

International Search Report and Written Opinion for International Application No. PCT/US2012/053289, International Filing Date Aug. 31, 2012, Applicant Cablecam, LLC.
(Continued)

*Primary Examiner* — Hanh Phan
(74) *Attorney, Agent, or Firm* — Factor Intellectual Property Law Group, Ltd.

(57) ABSTRACT

A system for transmitting data, images, and audio to and from an aerially moved payload, the system having one or more media converters for converting coax signals to fiber signals and at least two wave division multiplexers, one for combining two or more distinct fiber signals into a single fiber signal and one for splitting the two or more combined fiber signals back into two distinct fiber signals. The system also includes at least one line along which one or more of data, images, and audio may be transmitted to and from the aerially moved payload.

17 Claims, 4 Drawing Sheets

(56) References Cited

U.S. PATENT DOCUMENTS

| | | | |
|---|---|---|---|
| 4,710,819 A | 12/1987 | Brown | |
| 4,882,773 A | 11/1989 | Maloney | |
| 5,113,768 A | 5/1992 | Brown | |
| 5,157,725 A | 10/1992 | Lindholm | |
| 5,225,863 A | 7/1993 | Weir-Jones | |
| 5,278,687 A * | 1/1994 | Jannson et al. | 398/79 |
| 5,657,073 A | 8/1997 | Henley | |
| 5,778,303 A | 7/1998 | Shinozaki et al. | |
| 6,141,034 A | 10/2000 | McCutchen | |
| 6,301,034 B1 | 10/2001 | Speciale | |
| 7,036,436 B2 | 5/2006 | MacDonald et al. | |
| 7,058,966 B2 | 6/2006 | Buabbud | |
| 7,088,071 B2 | 8/2006 | Rodnunsky | |
| 7,127,998 B2 | 10/2006 | MacDonald et al. | |
| 7,224,382 B2 | 5/2007 | Baker | |
| 7,239,106 B2 | 7/2007 | Rodnunsky et al. | |
| 7,474,852 B1 * | 1/2009 | Jachetta et al. | 398/33 |
| 7,510,142 B2 | 3/2009 | Johnson | |
| 7,804,965 B2 | 9/2010 | Kawaguchi et al. | |
| 7,831,118 B2 | 11/2010 | Oikawa et al. | |
| 7,893,957 B2 | 2/2011 | Peters, III et al. | |
| 8,004,558 B2 | 8/2011 | Prechtl et al. | |
| 2004/0131359 A1 * | 7/2004 | Yamashita | 398/79 |
| 2006/0054782 A1 | 3/2006 | Olsen et al. | |
| 2006/0080722 A1 | 4/2006 | Santhoff | |
| 2006/0082655 A1 | 4/2006 | Vanderwill et al. | |
| 2007/0064208 A1 | 3/2007 | Giegerich et al. | |
| 2007/0291143 A1 | 12/2007 | Barbieri et al. | |
| 2009/0017879 A1 | 1/2009 | Tsfaty et al. | |
| 2009/0103909 A1 | 4/2009 | Giegerich et al. | |
| 2009/0207250 A1 * | 8/2009 | Bennett et al. | 348/144 |
| 2009/0237492 A1 | 9/2009 | Kikinis et al. | |
| 2010/0013927 A1 | 1/2010 | Nixon | |
| 2010/0260483 A1 | 10/2010 | Strub | |
| 2010/0283584 A1 | 11/2010 | Mcallister | |
| 2010/0288872 A1 | 11/2010 | Wiley | |
| 2011/0074916 A1 | 3/2011 | Demirdjian | |
| 2011/0091196 A1 | 4/2011 | Dougherty et al. | |
| 2011/0096136 A1 | 4/2011 | Liu et al. | |
| 2011/0196688 A1 | 8/2011 | Jones | |
| 2011/0204196 A1 | 8/2011 | Wharton | |
| 2011/0211524 A1 | 9/2011 | Holmes et al. | |

FOREIGN PATENT DOCUMENTS

| | | |
|---|---|---|
| WO | 9519903 | 7/1995 |
| WO | 2004109385 | 12/2004 |

OTHER PUBLICATIONS

Extended European Search Report for related European application No. 12826718.4 dated Mar. 11, 2015, 6 pages.

* cited by examiner

CONTROL SYSTEM FOR AN AERIALLY MOVED PAYLOAD

RELATED APPLICATIONS

This application is a continuation-in-part of U.S. patent application Ser. No. 13/471,924 entitled "Control System and Method for an Aerially Moved Payload System" filed May 15, 2012; this application also claims priority to U.S. Provisional Application Ser. No. 61/529,697 entitled "Control System For A 3D Aerial Camera" filed Aug. 31, 2011; U.S. Provisional Application Ser. No. 61/529,676 entitled "3D Aerial Camera System" filed Aug. 31, 2011; U.S. Provisional Application Ser. No. 61/532,788 entitled "Digital Microphone and Digital Microphone Control System for an Aerially Moved Payload" filed Sep. 9, 2011; U.S. Provisional Application Ser. No. 61/532,741 entitled "Control System For An Aerially Moved Payload System" filed Sep. 9, 2011; and, U.S. Provisional Application Ser. No. 61/607,993 entitled "Aerial Camera System Having Multiple Payloads" filed Mar. 7, 2012 the contents of all of which are fully incorporated herein by reference.

FIELD OF THE INVENTION

The present invention is directed to a control system for sending and receiving data from an aerially moved payload system, and more particularly from an aerial moved payload system having multiple payload devices.

BACKGROUND OF THE INVENTION

Aerial movement systems are useful in moving a payload, like for example a camera, over large expanses such as football fields, basketball courts, or even military testing sites. Examples of such systems which may be used to aerially move a payload may be found, for example, in U.S. Pat. Nos. 6,809,495; 6,873,355; 6,975,089; 7,088,071; 7,127,998; and, 7,239,106, and U.S. Publication No. 2011/0204197. While the remaining description may discuss these aerial movement systems with respect to moving a camera or multiple cameras at times, it should be appreciated by those having ordinary skill in the art that the present application, and all of the previously referenced patents may be utilized to aerially move any payload and is not limited to just imaging device like a camera or multiple cameras.

As described in various embodiments of the aforementioned patents, aerial movement systems having a payload, like for example a platform and/or a camera, typically include one or more lines (e.g., a cables, ropes, strings, cords, wires, or any other flexible materials) attached to the payload. The one or more lines typically extend to the payload from four or five support beams surrounding the surface over which the payload traverses, and are controlled by one or more motor reels which extend and retract each of the two to five lines attached to the payload. The motor reels may be controlled using timers, software algorithms, remote controls, or any means known in the art. As the lines are extended and retracted, the payload may be moved in three-dimensions, i.e. in the x-direction, the y-direction, and the z-direction.

In order to control and transmit and receive data from the payload (i.e. audio and video signals, control signals), typically a data transmission cable is extended and retracted with each of the one or more lines attached to, and used to control, the payload. The cables may be at least partially connected to, or embedded in the lines, with each cable being coupled to a motor to allow for the extension and retraction of the cable at the same rate as the control lines as the payload traverses over a surface below. In such systems, for example, four cables may be extended to the payload, one with each of the four lines extended to the payload. While utilizing four cables allows for the transmission of some data to and from the payload, it severely limits the amount of data which may be transmitted, particularly when cameras or other imaging devices are included in the payload. The limited ability of present systems to provide images and data severely limits the number of imaging devices which may be included in the payload and the ability of the payload to provide images capable of being merged to create stereoscopic or three dimensional images or varying images presenting different information or images.

In view of the foregoing, it would be advantageous to provide a system capable of allowing additional data, and in particular additional images or image data, to be transmitted to and from an aerially moved payload system.

The present invention is provided to solve these and other issues.

SUMMARY OF THE INVENTION

The present invention is directed to an improved control system for aerially moved payloads, the control system being capable of accommodating multiple payloads designed to capture and provide one or more of audio, images, and/or data or other measurements or characteristics from the area about which the system traverses. According to one aspect of the invention, the system includes a platform or object capable of carrying multiple payloads, the platform or object having at least one line (e.g., a cable, rope, string, cord, wire, or any other flexible material) attached thereto. The at least one line is configured to support and move the platform or object and any carried payloads. The at least one line is connected to and controlled by at least one motor and reel combination, providing two- or three-dimensional movement of the platform and any carried payloads. The at least one motor and reel combination may be connected to at least one object located proximate an area about which the payloads are to traverse. Alternatively, the at least one motor and reel combination may be located proximate at least one object, like for example a support post, located proximate an area about which the payloads are to traverse, and at least one sheave may be used to redirect and guide the at least one line to the platform. Each line may also includes a fiber optic or coaxial cable or the like, capable of transmitting information to and from the payload to a control center where any capture audio, images, or data is provided.

According to another aspect of the invention, in order to transmit increased amounts of certain types of data from the payloads, like for example video or images, sound, or measured or captured data signals, the control system may include one or more media converter and one or more wave division multiplexers ("WDM") for joining images and sound and/or data into multiplexed signals, converting images, sound, or data captured by the payloads to a fiber optic signal, multiplexing multiple joined fiber optic signals, and transmitting them along a single transmission line.

According to another aspect of the invention, rather than use a standard WDM, it is contemplated by the invention that one or more coarse wave division multiplexers ("CWDM") may be used. CWDMs also function to combine two or more fiber signals into a single signal, however, the CWDMs may take the additional step of actively resetting the frequency of the fiber waves to combine the two or more fiber video waves onto a single line.

According to another aspect of the invention at least one additional WDM or CWDM or de-multiplexer may be located at the control center which receives the signals and splits or de-multiplexes the joined fiber waves back into individual fiber signals. Splitting the waves re-creates the two or more separate images, sound signals, and/or data signals, allowing each viewed or analyzed separately, or allowing each image to be properly presented and merged to create one or more stereoscopic or three-dimensional images and/or multiple two-dimensional images.

According to another aspect of the invention, at least one additional media converter may be used by a control center to re-convert the re-divided fiber signals to coax signals for use.

According to another aspect of the invention, audio captured by the one or more payloads may be embedded into any images captured and provided to a control center along the fiber optic lines with any image feeds.

According to another aspect of the invention, the system may further include one or more modems and demodulators for transmitting data. Utilizing modems and demodulators allows data to be converted to audio signals and then embedded into the video signals and recovered using demodulation at the receiving end.

Other advantages and aspects of the present invention will become apparent upon reading the following description of the drawings and detailed description of the invention.

DETAILED DESCRIPTION

Figure 1:
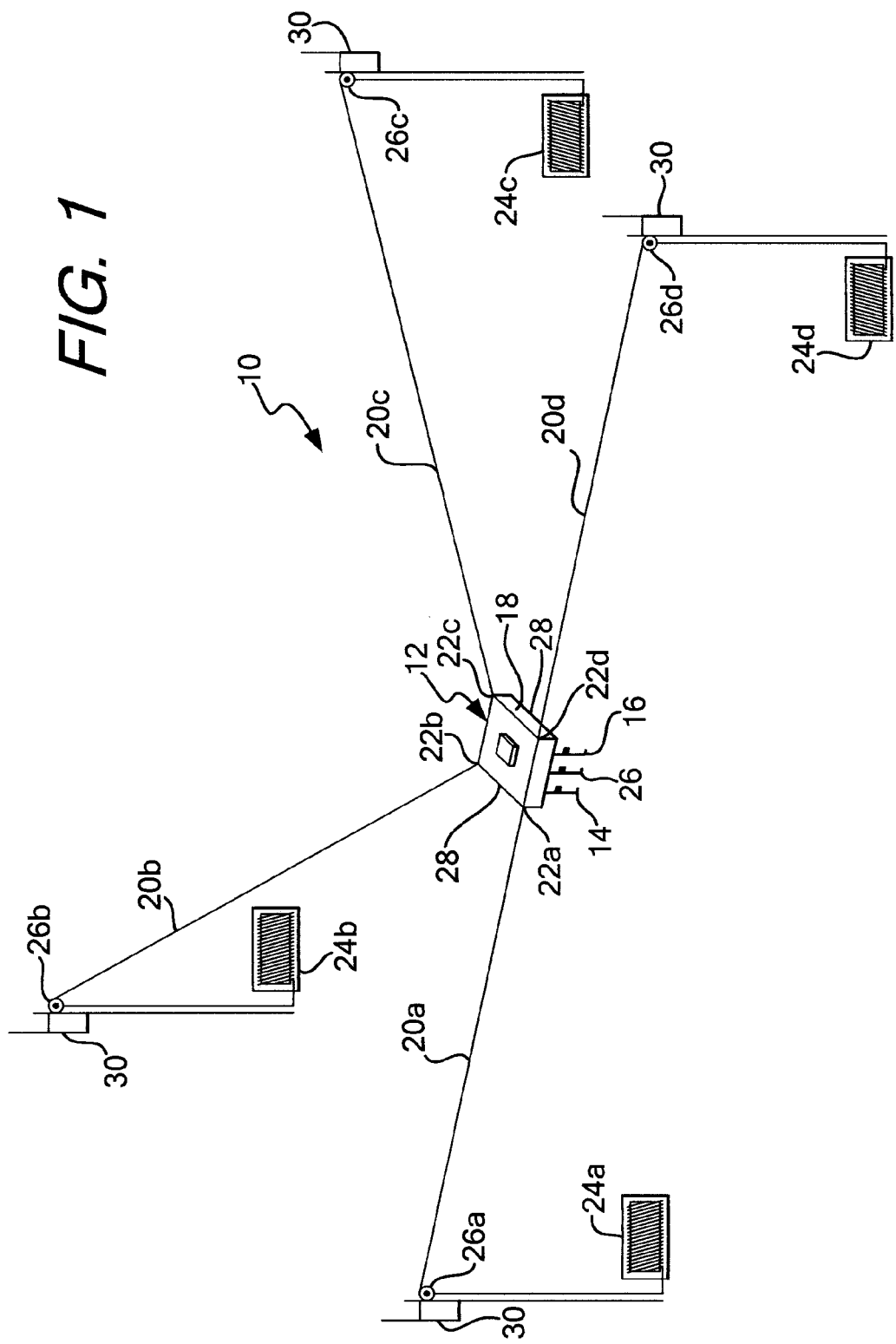
FIG. 1 shows an aerially moved payload system contemplated by the invention.

While the present invention is susceptible of embodiment in many different forms, there is shown in the drawings and will herein be described in detail, preferred embodiments of the invention with the understanding that the present disclosure is to be considered as an exemplification of the principles of the invention and is not intended to limit the broad aspect of the invention to the embodiments illustrated.

FIG. 1 shows an embodiment of a system 10 for aerially moving a payload 12. Payload 12 includes at least two payloads 14, 16 carried by platform 18. Additional payloads may be carried by platform 18 as needed. In order to move payloads 14, 16 and platform 18 in the x-, y-, and z-directions, at least one line, shown as lines 20a-20d, are connected to the platform in four locations, shown as corners 22a-22d. Coupled to and driving lines 20a-20d is at least one reel and motor, shown as motor and reel combinations 24a-24d. Motor and reel combinations 24a-24d act in conjunction with lines 20a-20d to move platform 18 and payloads 14, 16 in the x-, y-, and z-directions. Lines 20a-20d may contain, or have attached thereto, coaxial, optical, or other cables capable of transmitting and receiving information to and between a remote location and payloads 14, 16. These lines may provide, for example, any data, video, audio or signals collected or obtained by payloads 14, 16, and provide control for moving platform 18 and payloads 14, 16 in the x-, y-, and z-directions. In order to further facilitate movement, sheaves 26a-26d may also be utilized to guide lines 20a-20d between motor and reel combinations 24a-24d and platform 18.

Each motor may be hard wired to a control center or connected using wireless signals, like for example RF signals. Signals may be transmitted from a pilot or other user at the control center using, for example a computer and/or transceiver, to the motor and reel combinations to control movement of the platform. The signals provided to the motor and reel combinations may additionally include control signals for the payload and any other components located on the platform used to capture and transmit any captured images, data, and/or sound. These additional control signals intended for use by the payload and related components located on the platform may be transmitted from the motor and reel combinations through any coaxial, optical, or other cables associated with lines 20a-20d.

Figure 2:
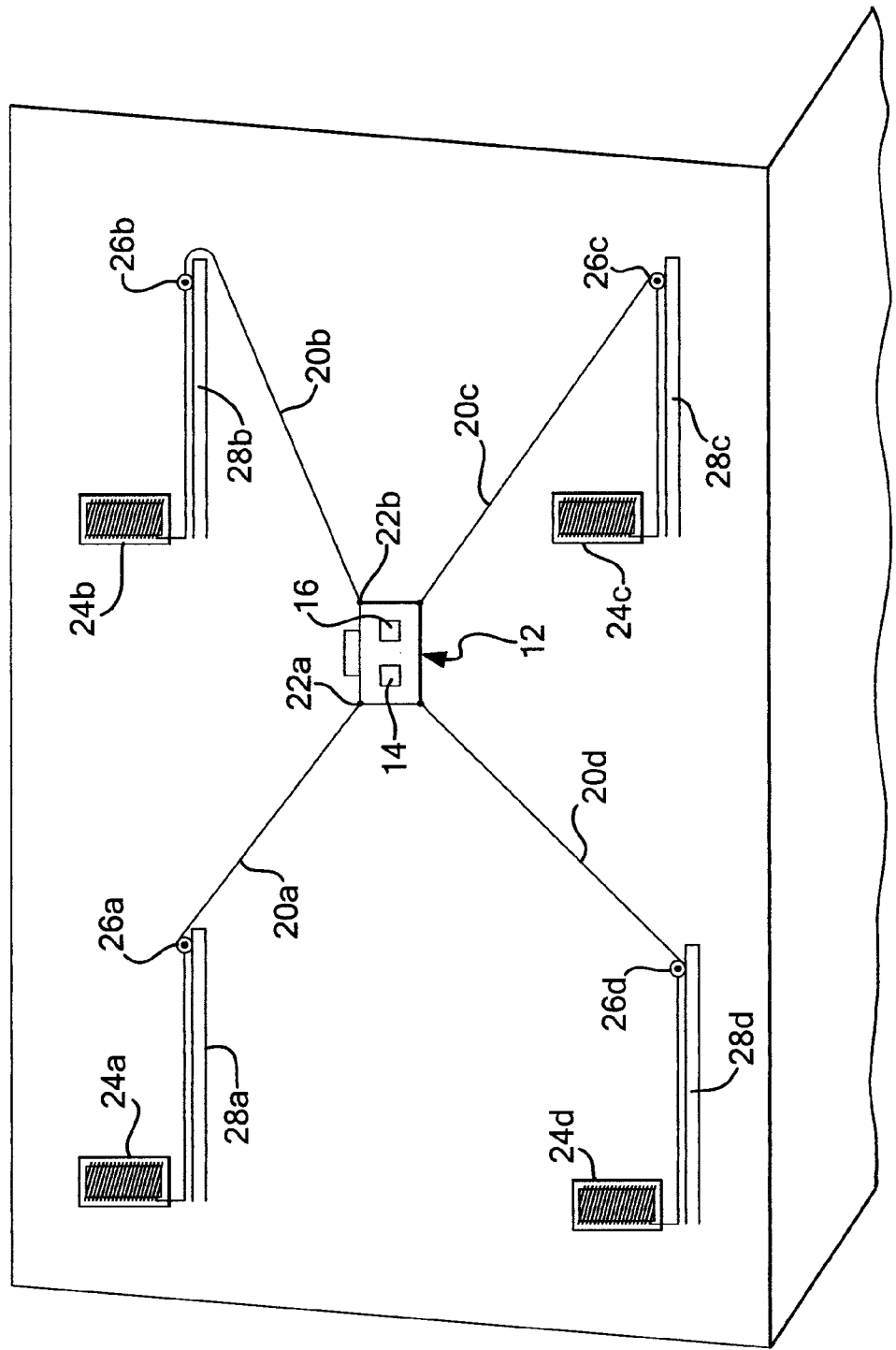
FIG. 2 shows an aerially moved payload system as contemplated by the invention.

Alternatively, as seen in FIG. 2, rather than traverse over an area, it is contemplated by the invention that aerial movement system 10 may allow for payload 12 to traverse along side an area. As seen in FIG. 2, posts or pillars 28 may extend substantially parallel to and/or above a ground surface or floor, allowing the payload to travel along side an area to be recorded. In such embodiments movement may be limited to only two directions, like for example the x- and z-directions. Configuring the system in this manner allows the payload to travel along side an area to obtain information when such is desirable or required.

Payloads 14, 16 and any additional payloads may include, but are not limited to, standard- or high-definition cameras or any other known imaging devices, cameras having zoom or prime lenses, analog or digital microphones, spectrum analyzers or other devices capable of measuring frequency or signal strength at the payload, thermometers or other temperature sensing devices, pressure sensing devices, light intensity or wavelength sensing devises, wind speed and direction sensors, or any other data collection devices capable of measuring a signal or characteristic of the area proximate which the payload is positioned to traverse. The at least two payloads may also include a position sensor or the like capable of providing information relative to the position of the sensor relative to the area over which the payload traverses, or, additionally or alternatively, the position of the payload relative to the motors and reels and/or sheaves. Rather than provide a position sensor on the payload, registration points 30 may be placed proximate each line or support post used to guide each line to detect the position of the payload.

According to one embodiment of the invention, at least two payloads 14, 16 include at least two cameras or other imaging capturing devices to be carried proximate an area to be observed, photographed, broadcasted, or filmed. Payloads 14, 16 and any additional payloads included in the system, may be, for example, lightweight video cameras containing standard-definition, high-definition or prime lenses, 3D mini cameras, cameras containing any filter lenses to enhance or remove particular colors from any images viewed and recorded or broadcast by the camera, infrared cameras or imaging devices, night vision cameras, thermal imaging devices, elevation or topography imaging devices, still-photo cameras, motion sensing cameras which only capture and/or provide images when detecting motion in the area over which the camera is located, high-speed or slow-motion cameras or any combination thereof. In addition to any of the aforementioned examples, the present invention contemplates payloads 14, 16 and any additional payloads being any device capable of capturing, broadcasting, recording, providing and/or filming optical images, with the possibility of mixing and matching any particular camera, for example, a thermal imaging device and an elevation or topography imaging device or devices to map and measure the characteristics of a chasm or volcano.

Cameras used with the system may include standard-definition and/or high-definition lenses capable of zooming and focusing on a particular area to provide two-dimensional images, or alternatively, may be prime lenses capable of providing images along a particular line of sight, without capability of zooming or focusing on an area along that line. If the cameras are configured to have a line of sight which intersects, the images taken by each camera may be merged to create a stereoscopic or three-dimensional image.

Figure 3:
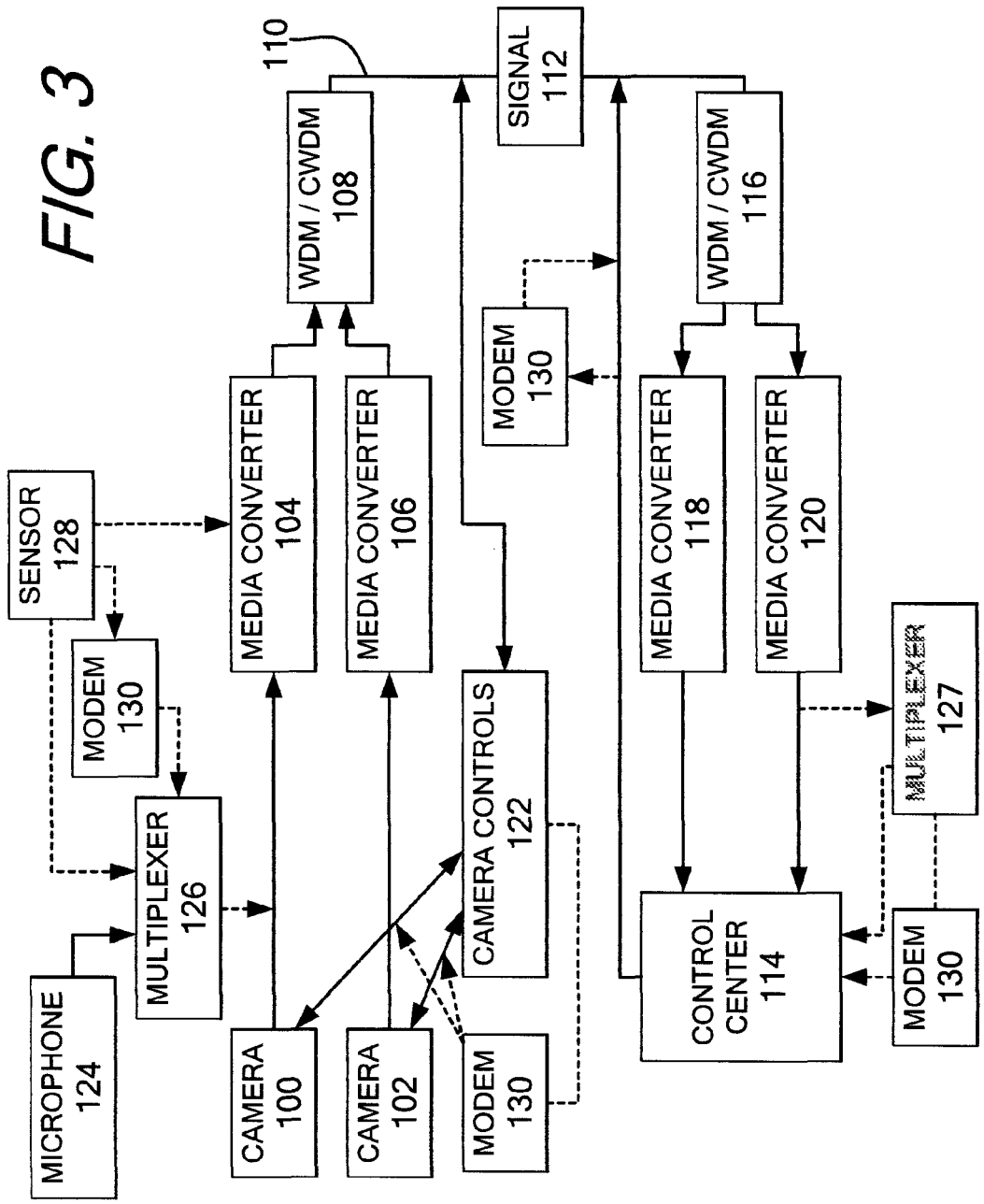
FIG. 3 shows a block diagram of an exemplary payload and control system contemplated by the present invention; and, FIG. 4 shows a flow chart of the method of controlling the aerially moved payload.
Figure 4:
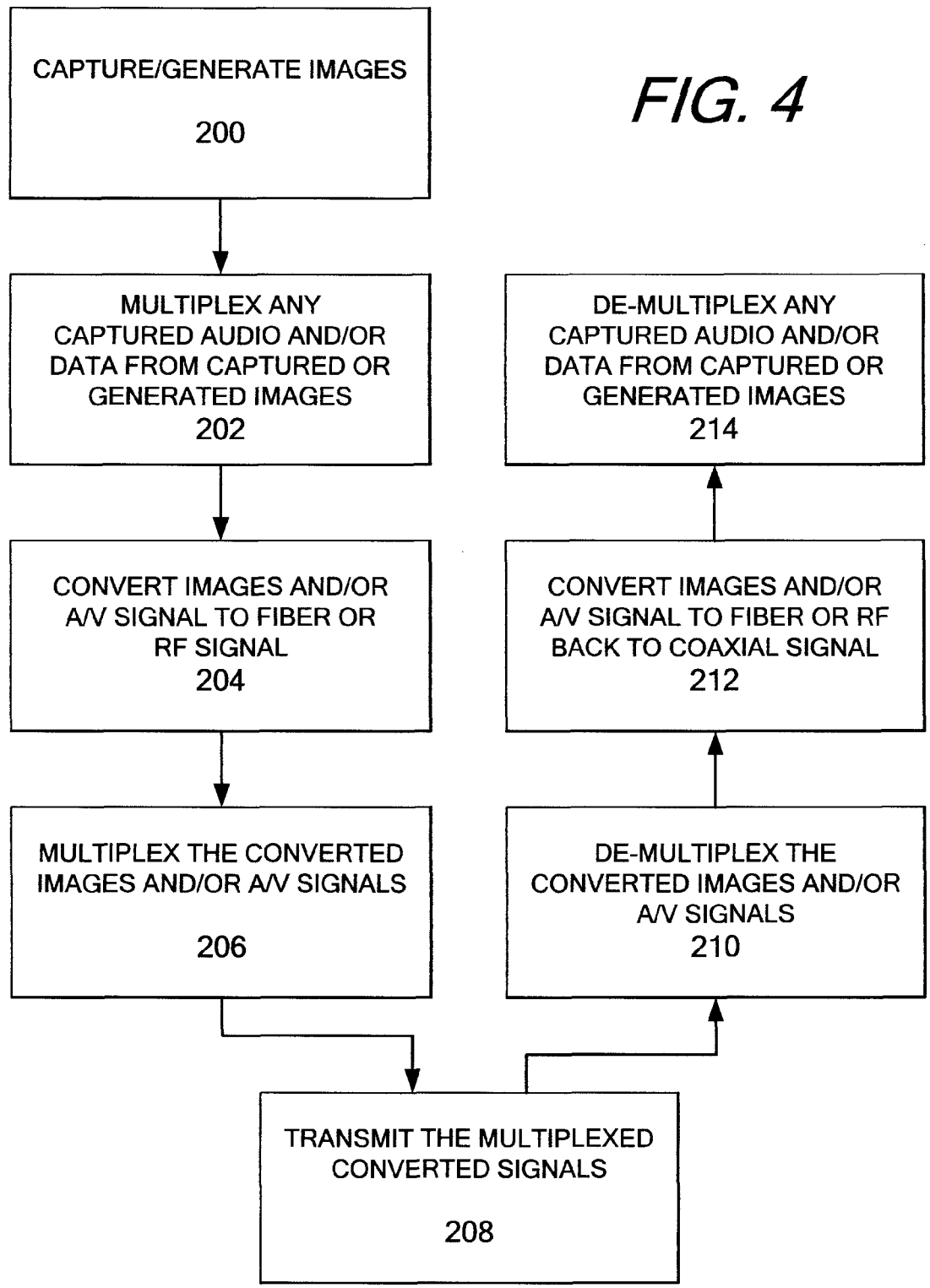

In order to provide the images captured by multiple cameras or imaging devices, the captured images may be combined and transmitted to a control station through a fiber optic line embedded or attached to any of lines 20a-20d. As shown in FIGS. 3 and 4, in order to combine the images for travel through one of the fiber optic cables, images captured by cameras or devices 100, 102 (step 200) which form part of the payload may be provided to media converters 104, 106 which may convert the captured images of each camera from a coaxial format to a light or laser of a particular wavelength, like for example approximately 1310 nm and approximately 1550 nm (step 204) after any necessary audio and/or data signals have been multiplexed with the images (step 202).

It is contemplated by the invention that a single media converter capable of converting multiple signals from coax to light or laser may be utilized in place of multiple media converters. In embodiments where more than two cameras are used, a media converter may be provided for each camera, or, alternatively, the number of media converters required for converting all coax signals to fiber signals may be provided. Regardless of the number of cameras, devices, or media converters, in order for each camera and image capturing device signal to be properly transmitted and decoded, each converted signal must be a fiber signal having a distinct wavelength. Continuing the example from above, it is contemplated that if three cameras or devices are used, the third video signal may be converted to a wavelength of 1430 nm, a fourth camera or device signal may be converted to a wavelength of 1670 nm and so on. Each converted signal should be provided with a distinct wavelength sufficiently spaced from any other converted signal wavelength to allow for easy detection and separation of each signal at a control center receiving the converted signals.

Once each camera or image capturing device signal is converted to a light or laser of a known wavelength, in order to transmit two video signals back to the control center along a single line, one or more wave division multiplexers ("WDM") or coarse wave division multiplexers ("CWDM") 108 may be used to combine two or more fiber signals into a single signal which is transmitted along a single fiber optic line 110 (which may be run through sheave 112) from the payload to the control center 114 (step 206). Combining the two or more video signals into a single wave is advantageous inasmuch as it allows multiple video or image signals to be transmitted from the payload to a control center on a single fiber or glass (step 208). The ability to transmit multiple video signals per fiber line or glass rather than only one signal per line allows for multiple imaging devices to be more easily used on a single payload, like for example multiple cameras for providing 2D and/or 3D images, an infrared camera, a thermal imaging device or camera, and a night vision camera.

The combined images are transmitted along a fiber line until they are received at the control center 114 which process and utilizes the images as desired, i.e. providing images to a computer or system for use and analysis or broadcasting and/or recording video footage. At the control center, or at a stage prior to reaching the control center, the combined converted signals may be separated back into individual signals using a second or additional WDMs or CDWMs or de-multiplexer 116 (step 210). The converted signals may then re-converted to their coax format in media converters 118, 120 (step 212) before being utilized by control center 114. If any audio and/or data signals have been multiplexed with the images, the re-converted signals may be de-multiplexed (step 214) using one or more multiplexors, de-multiplexors, WDMs or CWDMs to split the images and audio and/or data. As on the platform, it is contemplated that any number of media converters may be used to separate the signals, so long as each individual fiber signal is returned to its coax state. Once re-converted the signals may then be utilized for analysis, storage, broadcast, or any other use desired. In some embodiments it is contemplated that conversion from a fiber signal to a coax signal may not be required if the fiber signal is usable by the control center in that state.

In some embodiments, rather than convert coaxial signals to a fiber signal for transmission along a fiber optics lines, it is contemplated by the invention that the coaxial signals may be converted to radio-frequency ("RF") signals and wirelessly transmitted from the platform to the control center. In such embodiments both the platform and control center may include a transceiver capable of transmitting and receiving images, sound, and/or data at both the platform and control center. In order to transmit and receive RF signals, both the control center and the platform may include one or more media converters capable of converting coaxial signals to RF signals and RF signals to coaxial signals. It should be appreciated by those having ordinary skill in the art that both means of communication between the control center and platform may be used in a single system. For example, RF signals may be used to communicate from the control center to the platform and payloads while captured images, sound, and data are transmitted from the platform to the control center using fiber optic lines and fiber optics signals or vice versa.

In order to control the cameras and provide instructions and data to, while at the same time receive data and feedback from the payload, it is contemplated by the invention that both control center 114 and camera controls 122 on the platform may send data signals through a fiber optic cable connected to any of lines 20a-20d. It is contemplated by the invention that in place of cameras, only sensors or other data gathering tools may form each of the payloads used in the invention. The sensors may collect data regarding measurements and/or characteristics of a particular area proximate which the payloads are set to traverse. For example, the payloads may include spectrum analyzers or other devices capable of measuring frequency or signal strength, thermometers or other temperature sensing devices, pressure sensing devices, light intensity or wavelength sensing devises, wind speed and direction sensors, or any other data collection devices.

In addition to having combined video signals on a single optic or RF signal, audio and/or data signals may be embedded or interweaved in the video signals using methods known in the art to allow for one cable to provide both audio and video. For example, audio may be captured using a digital and/or analog microphone 124 and multiplexed with the images captured by camera 100 prior to being converted to a fiber or RF signal. The combined A/V signal may then be converted to a fiber or RF signal and transmitted to the control center or multiplexed with additional images, video, or multiplexed A/V signals and then transmitted to the control in the manner described herein. After being reconverted at the control center, the A/V signal may be split back into its audio and visual components using a de-multiplexer or WDM or CWDM 127 to de-multiplex the A/V signal. Audio from multiple microphones may be embedded into a single captured image or video.

Data captured by any sensors 128 included in the payload may be converted to optic or RF signals for direct transmission to the control center. Rather than direct transmission, data like sound, data captured by sensors may be multiplexed with any captured image signals prior to media conversion in the same manner as captured audio signals.

In some embodiments, in order to provide data, both the control center (or a location proximate thereto) and the payload or any camera control system located on the platform may include a modem 130 to modulate and demodulate data signals to audio signals and modulated audio signals back to data signals. Once modulated, the audio signals may be provided through a separate optics line, or alternatively embedded in an image signal, and provided to either the control center or on platform camera controls or payload. For example, data captured by any sensors 128 located on the platform may be converted to audio using modem 130 and embedded with a captured or generated video signal in the same manner as audio signals. Like audio signals, multiple modulated data signals may be embedded into a single video, and multiple multiplexed A/V signals having audio data may be multiplexed into a single signal. In order to utilize modems and audio signals, each of the payload or camera controls on the platform, and the control center, may utilize a modem capable of recovering the data information for use. Any number of modems may be located in the control center or on the platform as needed.

In embodiments where the payloads include only microphones or data collecting devices, or where embedding with captured images and/or video signals is not desired, in order to provide video signals for any data or audio signals to be embedded, it is contemplated by the invention that a phantom video signal or phantom video signals may be created or generated. These phantom signals may be combined and transmitted along the fiber optic or other lines with embedded audio signals (regular audio or converted data-to-audio signals) in substantially the same manner as captured images. Rather than, or in addition to, utilizing cameras (100 and 102) and capturing video and/or images utilizing at least two imaging devices (200), the phantom video generator may generate at least one phantom video signal and the payload microphones and/or data collecting devices may collect sound or data to be embedded in the generated phantom signals. The combined phantom video signals and any embedded sound and data may then be transmitted in substantially the same manner.

The above described embodiments of the present invention are intended to be examples only. Alterations, modifications and variations may be effected to the particular embodiments by those of skill in the art without departing from the scope of the invention, which is defined by the claims appended hereto.

I claim:

1. A system for transmitting data, images, and audio to and from an aerially moved payload, the system comprising:
    at least two devices, each device capturing one or more of data, images and/or audio;
    one or more media converters for converting captured data, image, and/or audio coax signals to fiber signals;
    at least two wave division multiplexers, one for combining two or more distinct fiber signals into a single fiber signal and one for de-multiplexing the two or more combined fiber signals back into two distinct fiber signals;
    at least one line along which one or more of data, images, and audio may be transmitted to and from the aerially moved payload.

2. The system of claim 1 wherein at least one of the at least two wave division multiplexers are coarse wave division multiplexers.

3. The system of claim 1 further comprising at least one modem for converting data signals to audio signals.

4. The system of claim 3 further comprising at least one demodulator for converting converted data signals back to data signals.

5. The system of claim 1 further comprising at least two cameras for gathering images, the at least two cameras forming part of the aerially moved payload and providing outputs to the one or more media converters.

6. A method for transmitting data, images, and audio to and from an aerially moved payload, the method comprising the steps of:
    capturing one or more of data, images, and audio using two or more payload devices;
    generating one or more video signals;
    converting captured data, images, and audio and the one or more video signals from coax signals to fiber signals;
    joining two or more fiber signals having different wavelengths into a single signal using one from the group consisting of: a wave division multiplexer and a coarse wave division multiplexer;
    transmitting the single signal over a fiber line;
    separating the joined fiber signal into two or more distinct fiber signals utilizing at least one from the group consisting of: a wave division multiplexer and a coarse wave division multiplexer.

7. The method of claim 6 further comprising the step of generating the one or more video signals by capturing images using one or more cameras included in the two or more payload devices.

8. The method of claim 6 further comprising the step of generating the one or more video signals using a phantom video signal generator.

9. The method of claim 6 further comprising the step of interweaving captured audio with at least one of the video signals using at least one multiplexer.

10. The method of claim 6 further comprising the step of converting the two or more distinct fiber signals to a coax signal after each of the two or more signals are separated from the joined fiber signal.

11. The method of claim 6 further comprising the step of transmitting data and instructions to the at least two cameras utilizing the fiber line.

12. The method of claim 11 further comprising the step of converting the data to an audio signal using a modem.

13. The method of claim 12 further comprising the step of demodulating the data-audio signal to recover the transmitted data.

14. The method of claim 6 further comprising the step of transmitting data captured by the at least two payload devices utilizing the fiber lines.

15. The method of claim 14 further comprising the step of converting the data to an audio signal using a modem.

16. The method of claim 15 further comprising the step of demodulating the data-audio signal to recover the transmitted data.

17. The method of claim 15 further comprising the step of interweaving the audio with the one or more generated video signals.

* * * * *